United States Patent [19]

Kawasaki et al.

[11] Patent Number: 4,604,012
[45] Date of Patent: Aug. 5, 1986

[54] TOOL CLAMPING DEVICE FOR A SPINDLE HEAD

[75] Inventors: Hisamitsu Kawasaki, Kariya; Yukio Kato, Nagoya, both of Japan

[73] Assignee: Toyoda Koki Kabushiki Kaisha, Kariya, Japan

[21] Appl. No.: 573,619

[22] Filed: Jan. 25, 1984

[30] Foreign Application Priority Data

Feb. 3, 1983 [JP] Japan .................. 58-16615

[51] Int. Cl.$^4$ .................. B23B 31/26; B23B 31/10
[52] U.S. Cl. .................. 409/233; 279/82; 279/89; 403/379; 408/239 R
[58] Field of Search .................. 409/233, 231, 232; 279/75, 53, 63, 82, 89; 408/239 R, 239 A; 29/568; 403/109, 112, 379

[56] References Cited

U.S. PATENT DOCUMENTS

| 3,684,303 | 8/1972 | Serra .................. 279/82 |
| 3,762,271 | 10/1973 | Poincenot .................. 409/233 |
| 3,813,782 | 6/1974 | Nilles et al. .................. 409/233 X |
| 3,851,562 | 12/1974 | Tomita et al. .................. 409/233 |
| 4,204,783 | 5/1980 | Hougen .................. 408/68 |

FOREIGN PATENT DOCUMENTS 50-86777 7/1975 Japan .
55-15942 4/1980 Japan .
1456611 11/1976 United Kingdom .......... 408/239 A Primary Examiner—Gil Weidenfeld
Assistant Examiner—Steven C. Bishop
Attorney, Agent, or Firm—Oblon, Fisher, Spivak, McClelland & Maier

[57] ABSTRACT

A tool clamping device used with a machine tool is provided for clamping a tool on a tool spindle. In a bore of the tool spindle, there is axially movably received a guide bush which is formed with a recess for permitting steel balls to retract toward radial outward directions. A retainer for holding the steel balls is received in a bore of the guide bush for axial movement relative thereto. The guide bush is connected to a draw bar which is axially movable in the bore of the tool spindle and which is spring-biased toward a rearward direction of the tool spindle. Thus, when the draw bar is spring-drawn toward the rear end of the spindle, the steel balls are restrained from radial outward movements through engagements with the internal surface of the guide bush thereby to clamp the pull stud of the tool. However, when the draw bar is moved toward the front end of the spindle against the biasing force of the spring, the steel balls are retracted into the recess of the guide bush thereby to release the pull stud of the tool.

3 Claims, 2 Drawing Figures

TOOL CLAMPING DEVICE FOR A SPINDLE HEAD

BACKGROUND OF THE INVENTION

1. Field of the Invention

The present invention relates to a tool clamping device for clamping a variety of tools selectively received in a tool spindle which is carried in a spindle head of a machine tool.

2. Description of the Prior Art

A prior art tool clamping device of this type is disclosed in Japanese examined, published utility model application No. 55-15942, for example. The known tool clamping device is constructed such that a cylindrical guide member is mounted on the front end of a draw bar which passes through a through bore of a tool spindle in a spring-biased manner. A plurality of steel balls, which are fitted in the circumferential wall of the guide member for movements in the radial directions, are engageable with a pull stud of a tool coaxially fitted in the front end of the tool spindle. The steel balls are also engageable with an inner circumferential surface of the bore of the tool spindle so that radial outward movements of the steel balls are restrained to clamp the tool on the tool spindle. In the tool clamping device constructed as above, when the draw bar is moved toward the front end of the tool spindle against the biasing force of the spring, the steel balls come to face a larger-diameter portion which is formed in the front end portion of the tool spindle bore, so that they can retract toward the radial outside to release the pull stud of the tool. However, it is impossible for the known device to clamp the tool in case the pull stud of the tool is shorter than the moving stroke of the guide member retaining the steel balls. This raises a problem that the prior art tool clamping device cannot be applied to a tool having a short pull stud.

SUMMARY OF THE INVENTION

It is, therefore, an object of the present invention to provide a tool clamping device which is capable of properly clamping even a tool having a short pull stud by enabling the steel balls held in the aforementioned guide member to retract toward the radial outward directions notwithstanding slight movement of the guide member.

In order to achieve the above-specified object, according to the present invention, there is provided a tool clamping device comprising a guide bush axially movably fitted in a bore of a tool spindle and formed with a recess for permitting steel balls to retract toward radial outward directions, a retainer guiding the steel balls and fitted in a bore of the guide bush for relative movement thereto in the axial direction, and a draw bar received in the bore of the tool spindle in a spring-biased manner and connected to the guide bush. In the state in which the draw bar is spring-drawn toward the rear end of the spindle, the steel balls are restrained from radial outward movements through engagements with the internal surface of the guide bush, so that the pull stud of the tool is maintained clamped on the tool spindle. However, when the draw bar is moved toward the front end of the spindle against the biasing force of the spring, the steel balls are retracted into the recess of the guide bush, so that the pull stud of the tool is released from such a clamped state.

BRIEF DESCRIPTION OF THE DRAWINGS

Other objects, features and advantages of the present invention will become more apparent from the following description taken in conjunction with the accompanying drawings, in which.

DETAILED DESCRIPTION OF THE PREFERRED EMBODIMENT

Figure 1:
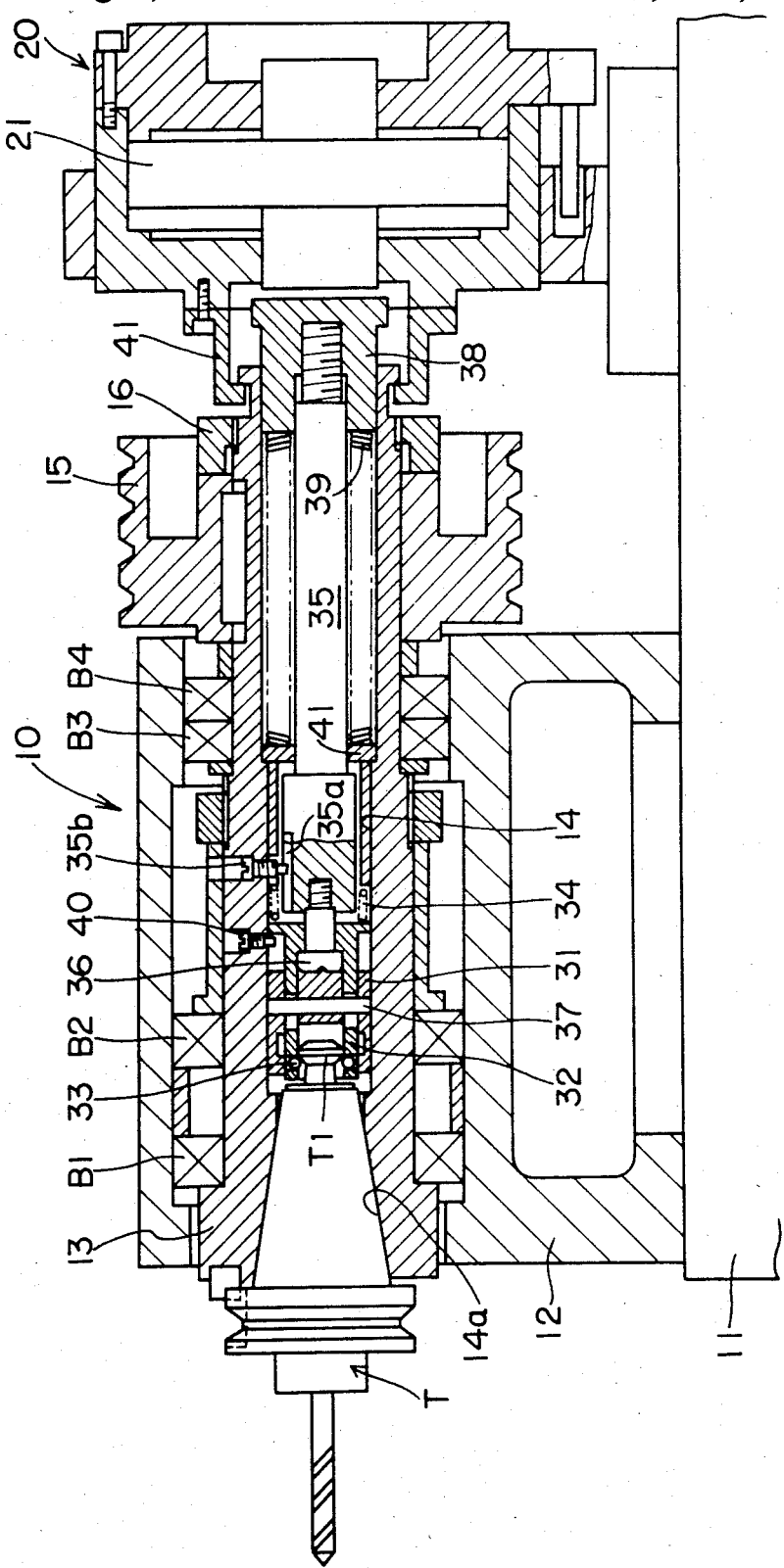
FIG. 1 is a longitudinal section showing a machine tool spindle head which is equipped with a tool clamping device according to the present invention.

In a machine tool spindle head generally indicated at reference numeral 10 in FIG. 1, a tool spindle 13 is rotatably carried through bearings B1 to B4 in a head housing 12 which is fixed on a head support 11. On the rear protruding portion of the tool spindle 13, there is positioned and fixed by means of a fastening nut 16 a pulley 15 which is driven by a drive device, not shown, through V-belts. To face the back of the head housing 12, on the other hand, there is fixed on the head support 11 an unclamping cylinder 20 which has built therein a piston 21 aligned with the spindle 13. In the construction thus far described, the front end portion of a through bore 14 of the spindle 13 is formed into a tapered bore 14a in which a tool T is detachably fittable. A retainer 32 is fitted in the through bore 14 through a guide bush 31 which constitutes a major part of the tool clamping device according to the present invention.

Figure 2:
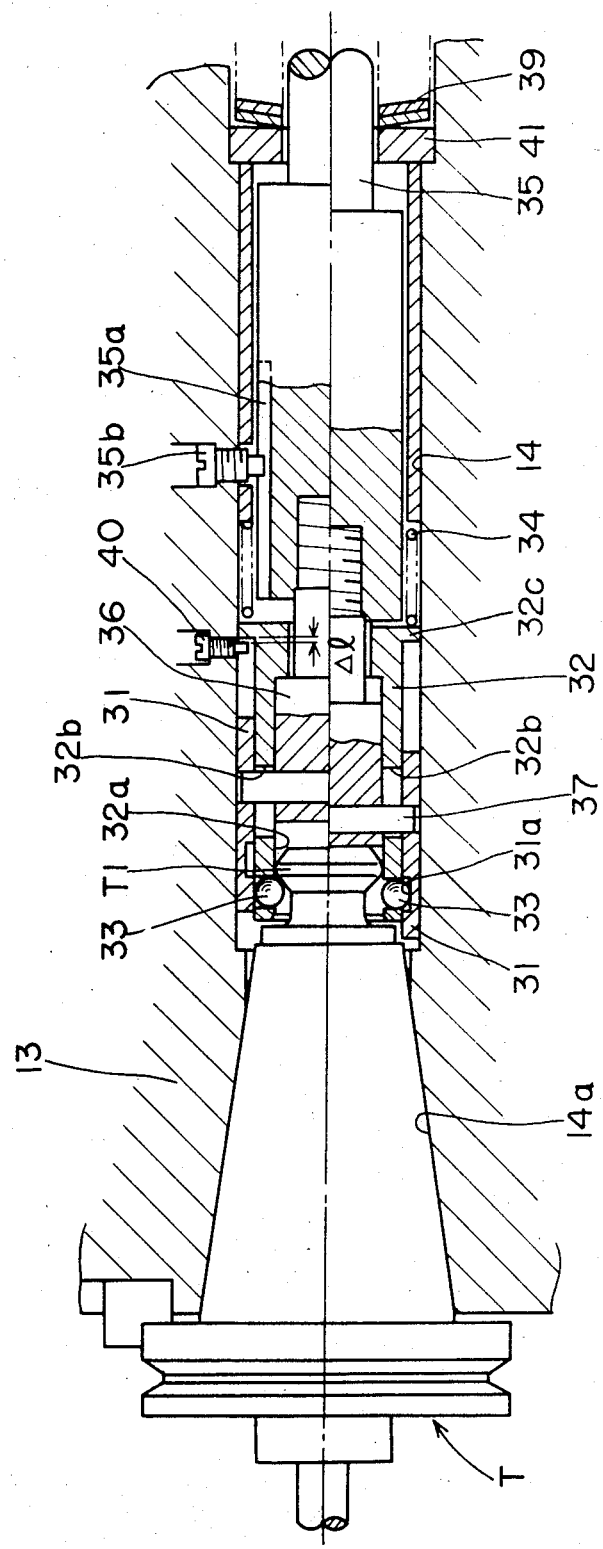
FIG. 2 is similar to FIG. 1 but shows the essential portion in an enlarged scale.

As better seen in FIG. 2, the guide bush 31 is fitted axially movably in the bore 14 and is formed at its internal surface with an annular groove 31a capable of receiving a plurality of steel balls 33 which are held in the front end portion of the retainer 32 for movements in the radial directions. In order to regulate the position of the retainer 32, a stopper 40 screwed in the spindle 13 is made engageable with an annular flange 32c formed at the rear end of the retainer 32. A spring 34 urges the retainer 32 toward an advanced position determined by the stopper 40, but allows the retainer 32 to retract when the tool T is clamped. Moreover, the retainer 32 is formed with a bore for permitting a pull stud T1 of the tool T to enter. In the same bore 32a, there is axially slidably received a connecting member 36, which is screwed in the front end of a draw bar 35. The guide bush 31 is coupled to the connecting member 36 by means of a pin 37, which is arranged through a pair of axial slots 32b formed in the retainer 32, so that the guide bush 31 can move in the axial direction integrally with the draw bar 35.

The draw bar 35 has its rear end screwed in a collar 38, which in turn is fitted axially movably in the rear end portion of the bore 14, as shown in FIG. 1. An axial groove 35a is formed on the outer surface of the front end portion of the draw bar 35. The head of a radial screw 35b fastened in the tool spindle 13 is engaged with the axial groove 35a so that the draw bar 35 is restrained from rotation. Moreover, the draw bar 35 is biased toward the rear end of the tool spindle 13 by the action of a set of multi-layered washer springs 39 which is sandwiched under compression between a spring seat 41 engaging a step portion in the bore 14 and collar 38.

In the spindle head 10 having the construction thus far described, when the draw bar 35 is pushed in the leftward direction, as seen in the drawing, by the action of the unclamping cylinder 20 against the urging force of the washer springs 39, as shown in the lower portion of FIG. 2, the guide bush 31 is moved forward integrally with the connecting member 36 until its annular recess 31a comes to face the steel balls 33. At this time, the retainer 32 is positioned at its advanced position determined by the stopper 40. When, in this state, the tool T is fitted in the tapered bore 14a of the spindle 13, the steel balls 33 are pushed by the head of the pull stud T1 of the tool T until they come into the annular recess 31a thereby to allow the pull stud T1 to enter.

After that, upon the release of the operation of the unclamping cylinder 20, the draw bar 35 is moved toward the rear end of the tool spindle 13 by the urging force of the waer springs 39 so that the guide bush 31 is carried rightwardly of the drawing together with the connecting member 36, as better seen in the upper portion of FIG. 2. When the guide bush 31 is retracted, the retainer 32 is held by the action of the spring 34 at the advanced position where it abuts against the stopper 40, thereby to effect movement relative to the guide bush 31. As a result, the steel balls 33 are pushed inward by the internal surface of the guide bush 31, whereby they are restrained from radial outward movements. When a shoulder portion of the connecting member 36 comes into abutting engagement with the inner end surface of the retainer 32, moreover, the retainer 32 is retracted by a distance against the force of the spring 34. Thus, the pull stud T1 is clamped by the urging force of the washer springs 39 through the retainer 32 an the steel balls 33.

Next, in case the pull stud T1 is unclamped to release the tool T, the draw bar 35 is pushed leftward of the drawing by the action of the unclamping cylinder 20 against the force of the washer springs 39. Thus, the recess 31a of the guide bush 31 comes to face the steel balls 33. As the tool T is pulled out from the tapered bore 14a, the steel balls 33 are pushed by an inner tapered face formed on the head of the pull stud T1, to enter the recess 31a thereby permitting the pull stud T1 to come out.

As is now understood from the description thus far made, according to the tool clamping device of the present invention, the guide bush 31 is moved within the bore 14 of the tool spindle 13 independently of the length of the pull stud T1 of the tool T so that the steel balls 33 held in the retainer 32 can be radially outwardly retracted into the recess 31a of the guide bush 31. This enables the ball-holding front end of the retainer 32 to be arranged close to the base end of the pull stud T1 of the tool T being received in the tool spindle 13. Thus, it is possible to properly clamp even a tool having a short pull stud.

Obviously, numerous modifications and variations of the present invention are possible in light of the above teachings. It is therefore to be understood that within the scope of the appended claims, the present invention may be practiced otherwise than as specifically described herein.

What is claimed is:

1. A tool clamping device used in a machine tool for clamping on a tool spindle a tool holder being inserted into a tapered bore of said tool spindle, by pulling a pull stud of said tool holder, comprising:

a guide bush slidably received in a through bore formed in said tool spindle for movement in an axial direction thereof and formed with an annular groove at an internal surface of its front end portion close to said tapered bore;

a hollow retainer slidably received in the bore of said guide bush for axial movement relative thereto and formed at its front end portion close to said tapered bore with a plurality of ball retaining holes extending in the radial direction;

a plurality of balls retained in said ball retainer holes for allowing said pull stud to come into and go out from a bore of said retainer when said ball retaining holes face said annular groove, but for preventing said pull stud from going out from the bore of said retainer when said ball retaining holes face the internal surface of said guide bush other than said annular groove;

drive means including a single actuator for forwarding and retracting said guide bush within said through bore, a connecting member received in the bore of said retainer and axially movable relative thereto, a pin extending through an axial slot formed in said retainer and integrally connecting said connecting member and said guide bush, a draw bar coupled to said connecting member and movable back and forth in an axial direction thereof within the through bore of said tool spindle, and draw bar drive means including said single actuator for forwarding and retracting said draw bar in the axial direction thereof;

engagement means for enabling said retainer to be retracted together with said guide bush when said guide bush is further retracted from the state in which said ball retaining holes face the internal surface of said guide bush other than said annular groove; and position control means for preventing retraction of said retainer until said ball retaining holes are brought into such a state as to face the internal surface of said guide bush other than said annular groove, but for allowing reraction of said retainer when said retainer is enabled by said engagement means to be retracted together with said guide bush, including a spring for pushing said retainer in the forward direction, and a stopper fixed in said tool spindle for regulating the forward end position of said retainer.

2. A tool clamping device as set forth in claim 1, wherein said engagement means includes:

a shoulder portion formed on said connecting member; and a bore end surface formed in said retainer for abutting engagement with said shoulder portion.

3. A tool clamping device as set forth in claim 2, wherein said draw bar means further includes:

a set of washer springs sandwiched between said tool spindle and said draw bar for urging said draw bar in the backward direction at all times;

said single actuator comprising a hydraulic cylinder for forwarding said draw bar against the urging action of said washer springs.

* * * * *